3,227,738
METAL SALTS OF THIO-BIS(ALKYLENE-β-CARBOXYACRYLATES)
Peter P. Klemchuk, Yorktown Heights, N.Y., assignor to Geigy Chemical Corporation, Greenburgh, N.Y., a corporation of Delaware
No Drawing. Filed June 11, 1962, Ser. No. 201,246
6 Claims. (Cl. 260—429)

This invention relates to certain new and useful salts of tetravalent tin. The invention also relates to the novel salts of similar usefulness containing zinc, calcium, cadmium or barium.

Specifically, the invention concerns compounds of the Formula I:

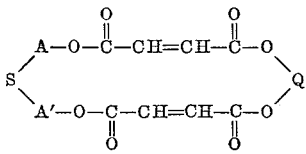 (I)

wherein

A is an alkylene group, e.g. ethylene,
A' is an alkylene group, e.g. ethylene, and
Q is a divalent atom or radical, e.g. Zn, Ca, Cd, Ba, dialkyltin.

The compounds of the Formula I show surprisingly good stabilizing properties for polyvinyl chloride resins, especially against thermal and light-induced degradation, especially when used in combination with other additives, such as for example, polyhydric compounds, including sorbitol.

In the Formula I, examples of alkylene groups represented by A or A' include: methylene, ethylene, propylene, methyl-ethylene, phenyl-ethylene, methyl-propylene, phenyl-propylene; lower alkylene groups having not more than 6 carbon atoms in the longest chain are preferred for A and A', which may be either straight- or branched-chain.

In Formula I, also, Q may be dialkyltin as illustrated by the following: dibutyltin, dimethyltin, diethyltin, dipropyltin, dipentyltin and dioctyltin. Normal alkyl groups are preferred, as are the lower alkyl groups.

Mixtures of the stabilizers of the Formula I may also be very useful as stabilizer systems for polyvinyl chloride resinous compositions. Moreover, the stabilizers of the Formula I can also be used in combination with other stabilizers, antioxidants, ultraviolet light absorbers, dyes, pigments, fillers, antistatic agents, plasticizers, etc.

The stabilizers of the invention are incorporated into the unstable material in conventional ways and amounts of stabilizers may fluctuate from 0.01% to 10% by weight, based on the unstabilized polymer composition.

The compounds of the Formula I are prepared from the appropriate thio-bis(alkylene β-carboxyacrylate) and a suitable base containing the desired divalent metal grouping. Thus, dialkyltin oxides are especially useful for reaction with thio-bis(ethylene β-carboxyacrylate). Calcium oxide, cadmium oxide, zinc oxide, and barium hydroxide are all usefully employed, preferably in aqueous media.

The following examples are illustrative of the invention, but there is not intention to limit the same thereto. In the examples, parts are by weight, unless otherwise indicated, and the relationship between parts by weight and parts by volume is as that between grams and cubic centimeters. Temperatures are in degrees centigrade.

EXAMPLE I.—DIBUTYLTIN SALT OF THIO-BIS (ETHYLENE β-CARBOXYACRYLATE)

Thiodiglycol (36.6 parts) is added over 30 minutes with stirring to 58.8 parts of maleic anhydride at 100°. Stirring is continued at 100° for 30 minutes. The thio-bis(ethylene β-carboxyacrylate) has a neutral equivalent of 148 (theory, 159). The semi-solid product without further purification is then mixed with 150 parts by volume of toluene and 74.7 parts of dibutyltin oxide. The reaction mixture is then heated at reflux, water being removed from the distillate and toluene being returned to the reaction flask. After about 45 minutes, all the water is removed. The reaction mixture is then treated with decolorizing charcoal, filtered through Super-Cel filter aid and concentrated to constant weight under vacuum. The yield of thio-bis(ethylene β-carboxyacrylate) dibutyltin, a viscous yellow oil, is 95% of theory, having a tin content of 21.70% (theory, 21.6%).

EXAMPLE II.—ZINC SALT OF THIO-BIS(ETHYLENE β-CARBOXYACRYLATE)

A solution of 20.7 parts of thio-bis(ethylene β-carboxyacrylate), prepared as in Example I, in 100 parts by volume of water is reacted with 8.41 parts of zinc oxide for 2 hours while stirring and heating intermittently at 60°. The reaction mixture is filtered through Super-Cel filter aid and concentrated under vacuum to constant weight. The yield of product, thio-bis(ethylene β-carboxyacrylate) zinc salt, a colorless solid, is 95% of theory, having a zinc content of 17.13% (17.1% of theory).

EXAMPLE III.—CALCIUM SALT OF THIO-BIS (ETHYLENE β-CARBOXYACRYLATE)

A solution of 30.4 parts of thio-bis(ethylene β-carboxyacrylate), prepared as in Example I, in 100 parts by volume of water is reacted with 5.79 parts of calcium oxide for 1 hour with stirring and heating at 60°; the resultant solution is filtered through Super-Cel filter aid and concentrated in vacuo to constant weight. The yield of colorless solid is 96.5% of theory and the so-obtained thio-bis (ethylene β-carboxypacrylate) calcium salt has a calcium content of 11.01% (theory, 11.2%).

EXAMPLE IV.—CADMIUM SALT OF THIO-BIS (ETHYLENE β-CARBOXYACRYLATE)

A solution of 30.1 parts of thio-bis(ethylene β-carboxyacrylate), prepared as in Example I, in 100 parts by volume of water is reacted with 13.03 parts of cadium oxide for two hours with stirring and intermittent heating at 60°. The solution is filtered and concentrated under vacuum to constant weight. The yield of solid concentrate of cadmium thio-bis(ethylene β-carboxyacrylate) is 95% of theory, the cadmium content being 27.4% (26.3% of theory).

EXAMPLE V.—BARIUM SALT OF THIO-BIS (ETHYLENE β-CARBOXYACRYLATE)

A solution of 29.6 parts of thio-bis(ethylene β-carboxyacrylate) in 100 parts by volume of water is reacted with 31.5 parts of barium hydroxide octahydrate with stirring for one hour. The solution is filtered and concentrated to constant weight under vacuum. The yield of colorless, solid material of barium salt of thio-bis(ethylene β-carboxyacrylate) is 95% of theory.

EXAMPLE VI.—STABILIZED POLYVINYL CHLORIDE

A sample of stabilized resin is prepared by milling for 10 minutes at 165° 100 parts of polyvinyl chloride resin (QYSM-5, Bakelite, Union Carbide Corporation, Bakelite Division, N.Y., N.Y.), 2 parts of dibutyltin salt of thio-bis(ethylene-$\beta$-carboxyacrylate), the so-stabilized resin being protected against thermal instability as evidenced by tests in the forced draft oven at measured intervals and constant temperature of 190°. The stabilized resin is compared to a blank for development of colour due to thermal instability and rated according to the Gardner Color scale. After a quarter hour the stabilized resin has a Gardner Color rating of 1, while the blank has a Gardner Color rating of 16. The blank fails after one half hour, while the above stabilized resin has a Gardner Color rating of 2.

If, in the same manner, each of the following stabilizers is incorporated singly into polyvinyl chloride resin, then similarly good stabilization against thermal degradation is obtained, according the compounds of Table I.

*Table I*

| Stabilizer: | Total parts/hundred, stabilizer |
|---|---|
| (a) Zinc salt of thio-bis(ethylene $\beta$-carboxyacrylate) | 2 |
| (b) Calcium salt of thio-bis(ethylene $\beta$-carboxyacrylate) | 2 |
| (c) Cadmium salt of thio-bis(ethylene $\beta$-carboxyacrylate) | 2 |
| (d) Barium salt of thio-bis(ethylene $\beta$-carboxyacrylate) | 2 |
| (e) 1 part/hundred of (a)+1 part/hundred of (b) | 2 |
| (f) 00.67 part/hundred of (c)+1.33 part/hundred of (d) | 2 |

What is claimed is:
1. A compound of the formula

$$\begin{array}{c} A-O-CO-CH=CH-CO-O \\ (S) \\ A'-O-CO-CH=CH-CO-O \end{array} Q$$

wherein
A is lower alkylene,
A' is lower alkylene, and
Q is a divalent member selected from the class consisting of dialkyl tin, zinc, calcium, cadmium and barium.

2. Dibutyltin salt of thio-bis(ethylene $\beta$-carboxyacrylate).
3. Zinc salt of thio-bis(ethylene $\beta$-carboxyacrylate).
4. Calcium salt of thio-bis(ethylene $\beta$-carboxyacrylate).
5. Cadmium salt of thio-bis(ethylene $\beta$-carboxyacrylate).
6. Barium salt of thio-bis(ethylene $\beta$-carboxyacrylate).

References Cited by the Examiner

UNITED STATES PATENTS

| 2,356,586 | 8/1944 | Hentrich et al. | 260—485 |
| 2,892,856 | 6/1951 | Ramsden et al. | 260—429.7 |
| 2,668,848 | 2/1954 | Neuworth | 260—485 |
| 2,723,965 | 11/1955 | Leistner et al. | 260—45.75 |
| 2,938,013 | 5/1960 | Mack et al. | 260—45.75 |
| 2,965,661 | 12/1960 | Ramsden | 260—429.7 |
| 2,972,595 | 2/1961 | Bavely et al. | 260—45.7 |

FOREIGN PATENTS

| 837,467 | 6/1960 | Great Britain. |
| 345,340 | 5/1960 | Switzerland. |

TOBIAS E. LEVOW, *Primary Examiner.*

LEON J. BERCOVITZ, *Examiner.*